United States Patent
Fetz et al.

(10) Patent No.: US 10,525,920 B2
(45) Date of Patent: Jan. 7, 2020

(54) REAR IMPACT GUARD ASSEMBLY FOR TRAILERS

(71) Applicant: Great Dane LLC, Chicago, IL (US)

(72) Inventors: Charles R. Fetz, Savannah, GA (US); Daniel E. Carter, Savannah, GA (US); Matthew M. Gunzburger, Brooklet, GA (US); Bradley W. Stephens, Rincon, GA (US); Christian S. Lee, Pooler, GA (US)

(73) Assignee: Great Dane LLC, Chicago, IL (US)

( * ) Notice: Subject to any disclaimer, the term of this patent is extended or adjusted under 35 U.S.C. 154(b) by 48 days.

(21) Appl. No.: 15/610,462

(22) Filed: May 31, 2017

(65) Prior Publication Data
US 2018/0345891 A1    Dec. 6, 2018

(51) Int. Cl.
| B60R 19/56 | (2006.01) |
| B62D 33/04 | (2006.01) |
| B62D 25/20 | (2006.01) |

(52) U.S. Cl.
CPC .......... B60R 19/56 (2013.01); B62D 25/2054 (2013.01); B62D 33/04 (2013.01)

(58) Field of Classification Search
CPC ................................ B60R 19/56; B60R 19/44
USPC ......................................... 293/102, 142–144
See application file for complete search history.

(56) References Cited

U.S. PATENT DOCUMENTS

| 6,652,010 | B1* | 11/2003 | Huddle ................... B60R 19/56 |
| | | | 293/102 |
| 8,950,793 | B2 | 2/2015 | Deighton |
| 9,566,923 | B2 | 2/2017 | Wylezinski et al. |
| 2014/0097304 | A1* | 4/2014 | Mastro ...................... F16L 3/24 |
| | | | 248/73 |
| 2018/0009401 | A1* | 1/2018 | Miller ..................... B60R 19/24 |

FOREIGN PATENT DOCUMENTS

| GB | 2327645 A | * | 2/1999 | ............. B60R 19/26 |
| JP | 2005-225327 | * | 8/2005 | |

OTHER PUBLICATIONS

Canadian Office Action dated Mar. 25, 2019, for corresponding Canadian Application No. 3,006,823.
Machine translation of JP2005-225327 for "Rear Under Run Protector, and it's Manufacturing Method" to Yutaka Fukushima.

* cited by examiner

*Primary Examiner* — Dennis H Pedder
(74) *Attorney, Agent, or Firm* — Nelson Mullins Riley & Scarborough LLP

(57) ABSTRACT

A semi-trailer has a rear impact guard including an elongated horizontal member that attaches to a trailer by a pair of vertical guards. The horizontal member may have a top surface, a bottom surface, and a leading edge from which a surface of the guard member extends rearward to the top or bottom surface. The rear impact guard may include a pair of gussets that extend from the vertical guards. Each gusset may include a main generally planar portion, a first stiffening flange perpendicular to the main portion, and a second stiffening flange perpendicular to the first stiffening flange.

8 Claims, 10 Drawing Sheets

REAR IMPACT GUARD ASSEMBLY FOR TRAILERS

FIELD OF THE INVENTION

Example embodiments generally relate to cargo carrying trailers and, in particular, to rear impact guard assemblies for a trailer.

BACKGROUND OF THE INVENTION

A wide variety of trailers are known for carrying cargo. For example, van type trailers typically include a deck assembly supported by a side wall structure, wheels, and front legs. The deck assembly may include longitudinal floor boards and transverse cross-members, such as I-beams, extending between opposing bottom rails. The deck transfers its load to the bottom rails, wheels, and, depending upon whether or not the trailer is coupled to a tractor or is free-standing, to a tractor fifth wheel or to retractable front legs on the trailer.

SUMMARY OF THE INVENTION

Some example embodiments enable the provision of a rear impact guard assembly and a semi-trailer comprising the same. According to an example embodiment, a semi-trailer includes two opposed side walls, a floor extending between lower ends of the two side walls, a roof extending between upper ends of the two side walls, a front wall extending between forward ends of the side walls and between forward ends of the roof and the floor, and a rear frame attached to rearward ends of the side walls, the roof, and the floor. The floor includes a deck and a plurality of transverse support members beneath the deck that each extends in a first direction that is perpendicular to a longitudinal dimension of the trailer, extending between the front wall and the rear frame, and that are spaced from each other in a second direction parallel to the longitudinal dimension. The floor is configured to connect to a fifth wheel of a tractor. A plurality of axles attach beneath the transverse members at the rearward end of the semi-trailer and a plurality of wheels disposed on the axles. A guard member is elongated in the first direction and spans at least a majority of the width of the semi-trailer in the first direction. A first vertical support member and a second vertical support member, each attach to and extend below the rear frame and attach to the guard member, thereby attaching the guard member to the rear frame. The first vertical support member and the second vertical support member are spaced apart from each other in the first direction. The guard member has a leading edge extending at a forward end of the guard member in the first direction, a top portion, and a bottom portion, and wherein the guard member defines a surface extending from the leading edge to one of the top portion and the bottom portion rearward from a vertical plane that includes the leading edge.

In another example embodiment, a semi-trailer includes two opposed side walls, a floor extending between lower ends of the two side walls, a roof extending between upper ends of the two side walls, a front wall extending between forward ends of the side walls and between forward ends of the roof and the floor, and a rear frame attached to rearward ends of the side walls, the roof, and the floor. The floor includes a deck and a plurality of transverse support members beneath the deck that each extends in a first direction that is perpendicular to a longitudinal dimension of the trailer extending between the front wall and the rear frame and that are spaced from each other in a second direction parallel to the longitudinal dimension. The floor is configured to connect to a fifth wheel of a tractor. A plurality of axles attach beneath the transverse members at the rearward end of the semi-trailer and a plurality of wheels disposed on the axles. A guard member is elongated in the first direction and spans at least a majority of the width of the semi-trailer in the first direction. A first vertical support member and a second vertical support member each attach to and extend below the rear frame and attach to the guard member, thereby attaching the guard member to the rear frame. The first vertical support member and the second vertical support member are spaced apart from each other in the first direction. A first strut extends between the floor and the lower end of the first vertical support member and/or the guard member and attaches to the lower end of the first vertical support member and/or the guard member. A second strut extends between the floor and the lower end of the second vertical support member and/or the guard member and attaches to the lower end of the second vertical support member and/or the guard member. Each of the first strut and the second strut include a first vertically oriented, generally planar portion extending in the second direction and having a lower generally diagonal edge that extends at an acute angle with respect to horizontal, a first generally planar stiffening flange extends perpendicular to the first planar portion from the diagonal edge, and a second generally planar stiffening flange extends from an edge of the first stiffening flange opposite the first planar portion in a direction perpendicular to the first stiffening flange.

In yet another example embodiment, a rear guard is for use with a trailer having a cargo compartment including two opposed side walls, a floor extending between lower ends of the two side walls, a roof extending between upper ends of the two side walls, a front wall extending between forward ends of the side walls and between forward ends of the roof and the floor, and a rear frame attached to rearward ends of the side walls, the roof, and the floor. The floor includes a deck and a plurality of transverse support members beneath the deck that each extends in a first direction that is perpendicular to a longitudinal dimension of the trailer extending between the front wall and the rear frame and that are spaced from each other in a second direction parallel to the longitudinal dimension. The floor is configured to connect to a fifth wheel of a tractor. A plurality of axles attach beneath the transverse members at the rearward end of the semi-trailer and a plurality of wheels disposed on the axles. The rear guard includes a guard member that is elongated in the first direction and spans at least a majority of the width of the semi-trailer in the first direction. A first vertical support member and a second vertical support member, each attach to and extend below the rear frame and attach to the guard member, thereby attaching the guard member to the rear frame. The first vertical support member and the second vertical support member are spaced apart from each other in the first direction. The guard member has a leading edge extending at a forward end of the guard member in the first direction, a top portion, and a bottom portion, and wherein the guard member defines a surface extending from the leading edge to one of the top portion and the bottom portion rearward from a vertical plane that includes the leading edge.

In still another example embodiment, a rear guard is for use with a trailer having a cargo compartment including two opposed side walls, a floor extending between lower ends of the two side walls, a roof extending between upper ends of the two side walls, a front wall extending between forward ends of the side walls and between forward ends of the roof and the floor, and a rear frame attached to rearward ends of the side walls, the roof, and the floor. The floor includes a deck and a plurality of transverse support members beneath the deck that each extends in a first direction that is perpendicular to a longitudinal dimension of the trailer extending between the front wall and the rear frame and that are spaced from each other in a second direction parallel to the longitudinal dimension. The floor is configured to connect to a fifth wheel of a tractor. A plurality of axles attach beneath the transverse members at the rearward end of the semi-trailer and a plurality of wheels disposed on the axles. The rear guard includes a guard member that is elongated in the first direction and spans at least a majority of the width of the semi-trailer in the first direction. A first vertical support member and a second vertical support member each attach to and extend below the rear frame and attach to the guard member, thereby attaching the guard member to the rear frame. The first vertical support member and the second vertical support member are spaced apart from each other in the first direction. A first strut extends between the floor and the lower end of the first vertical support member and/or the guard member and attaches to the lower end of the first vertical support member and/or the guard member. A second strut extends between the floor and the lower end of the second vertical support member and/or the guard member and attaches to the lower end of the second vertical support member and/or the guard member. Each of the first strut and the second strut include a first vertically oriented, generally planar portion extending in the second direction and having a lower generally diagonal edge that extends at an acute angle with respect to horizontal, a first generally planar stiffening flange extends perpendicular to the first planar portion from the diagonal edge, and a second generally planar stiffening flange extends from an edge of the first stiffening flange opposite the first planar portion in a direction perpendicular to the first stiffening flange.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
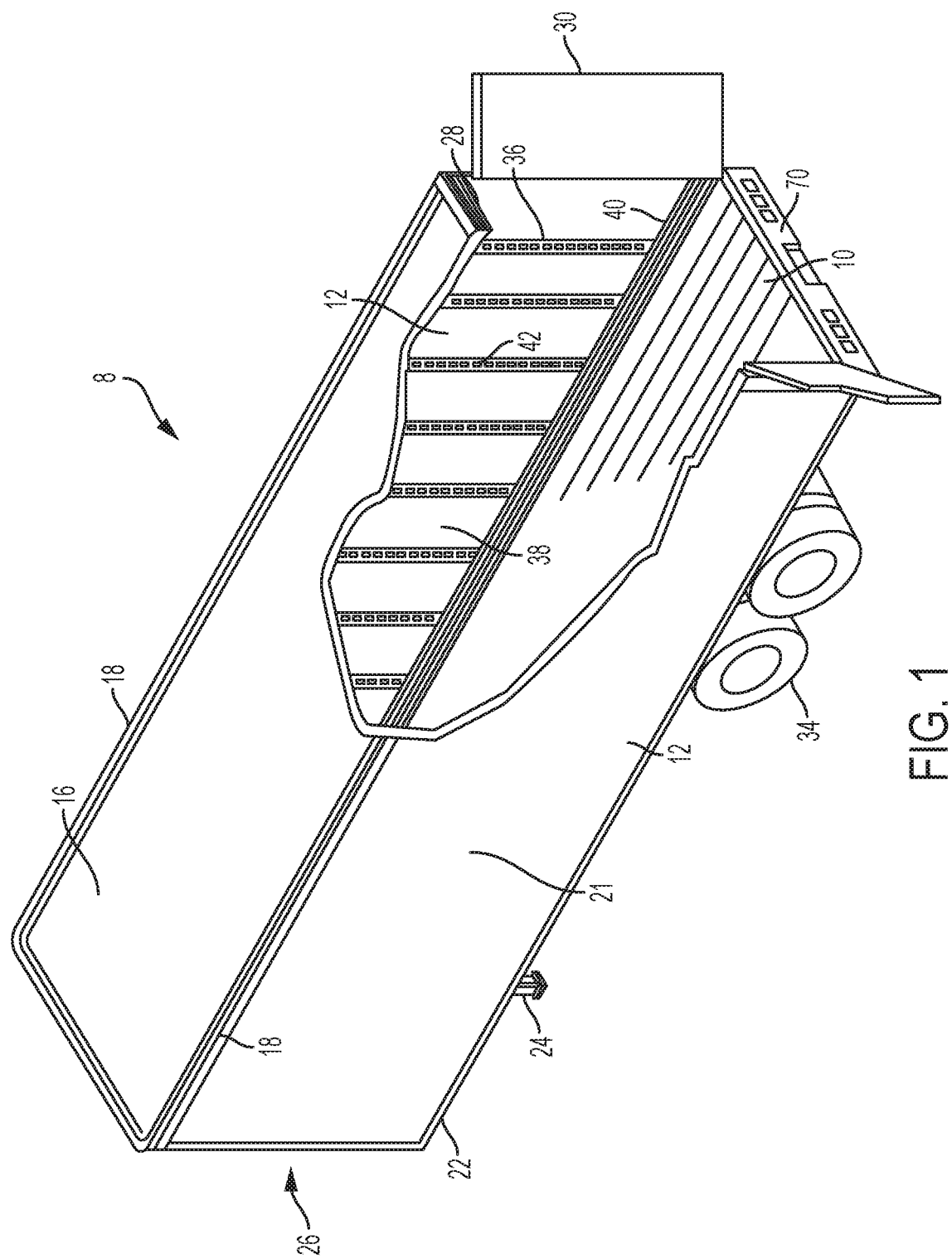
FIG. 1 is a perspective view of a semi-trailer according to an example embodiment.

Repeat use of reference characters in the present specification and drawings is intended to represent same or analogous features or elements of the invention according to the disclosure.

DESCRIPTION OF THE PREFERRED EMBODIMENTS

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Like reference numerals refer to like elements throughout. As used herein, "operable coupling" should be understood to relate to direct or indirect connection that, in either case, enables functional interconnection of components that are operably coupled to each other.

As used herein, terms referring to a direction or a position relative to the orientation of a semi-trailer, such as but not limited to "vertical," "horizontal," "above," or "below," refer to directions and relative positions with respect to semi-trailer's orientation in its normal intended operation, as indicated in FIG. 1.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

FIG. 1 illustrates a trailer 8 having a floor 10, two side walls 12, and a roof 16. The two side walls 12 are identically constructed, though mirror images of each other. Roof 16 is attached to side walls 12 by top rails 18, and each side wall is connected to floor 10 by a bottom rail 22 (one of which is shown in FIG. 1). The trailer includes retractable legs 24, a forward end wall 26, and a rearward end frame 28. Once assembled, the roof, floor, and side walls form a trailer having a generally rectangular cross-section when viewed from the rear. The distance between inner surfaces of the two side walls 12 is generally greater than 90 inches, and the distance between outer side wall surfaces of is generally less than 110 inches.

Each of a pair of doors 30 at the trailer's rearward end are pivotally connected to rear end frame 28, although the trailer may have a single roll-up door in other embodiments, as should be understood in this art. A plurality of wheels 34 support the trailer's rearward end and facilitate movement of the trailer when coupled to a tractor (not shown). Wheels 34 rotate with respect to a plurality of axles (not shown) that extend transverse to the longitudinal direction of the trailer and transfer the load from the cargo, through the trailer's chassis, to the wheels. More specifically, the axles support a suspension system, for example an air ride suspension or a leaf spring system that is attached to longitudinally extending slide rails upon which the suspension elements are adjustably attached and that attach to the floor's cross members so that load from the cargo interior transfers to the axles and the wheels from the axles' attachment to the cross members via the suspension. A front end of the semi-trailer includes a kingpin (not shown) that is configured to engage the trailer with a fifth wheel (not shown) of the tractor. The fifth wheel includes a flat plate that is typically greased so that a lower surface of the trailer slides against an upper surface of the fifth wheel. A fifth wheel coupling enables the trailer to pivot in the horizontal plane with respect to the tractor.

Figure 2:
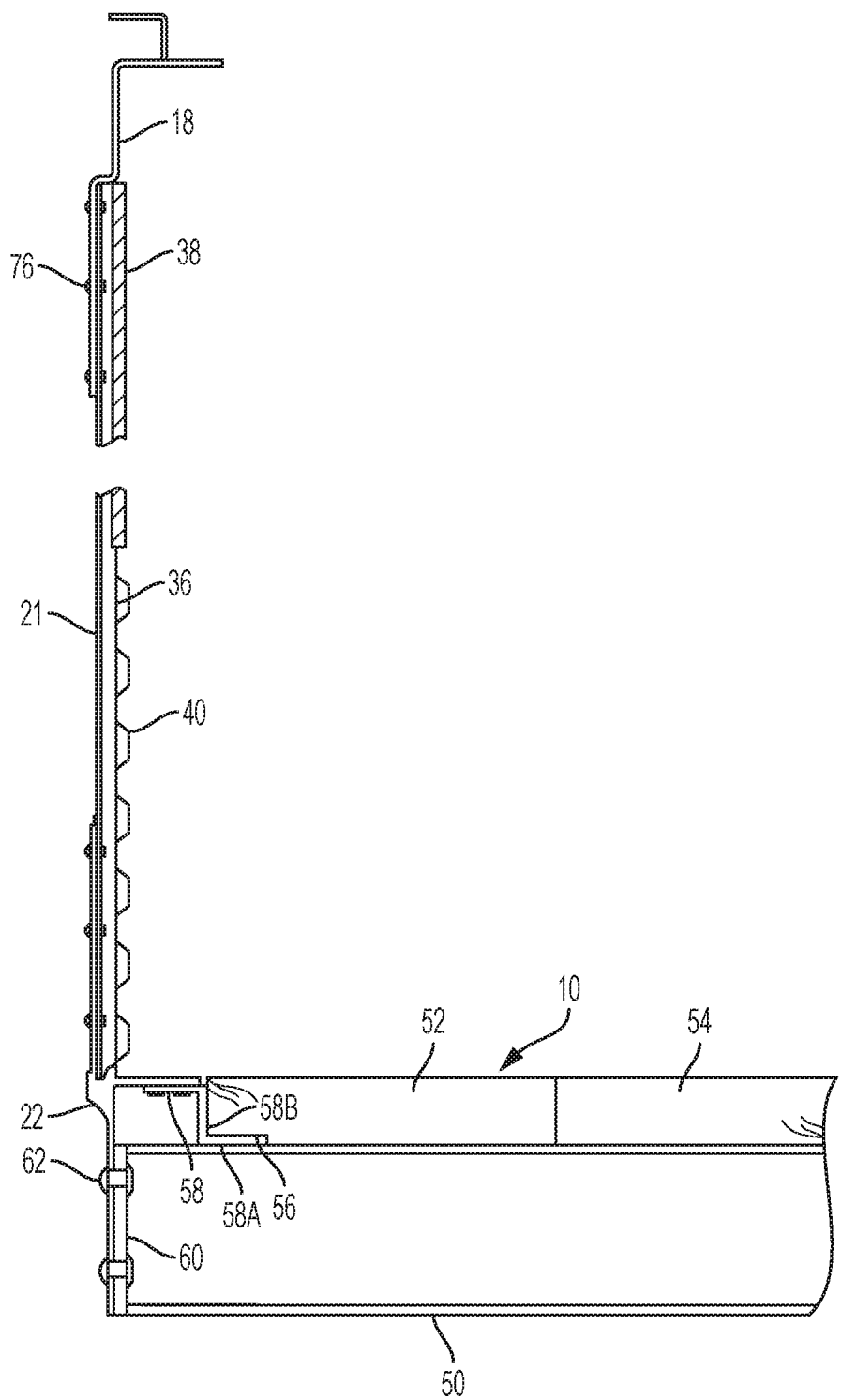
FIG. 2 is a cross-sectional view of the semi-trailer of FIG. 1, perpendicular to its longitudinal direction.

Referring also to FIG. 2, side wall 12 includes a plurality of vertical posts 36, a plurality of interior side wall liner panels 38, and one or more scuff bands 40. The liner panels interconnect the posts, and the scuff band is received within a recessed portion of a bottom portion of posts 36. Each post includes a longitudinal front face through which is defined a series of apertures 42 for receipt of cargo straps and the like to secure the trailer contents.

Panels 38 are fastened to posts 36 by screws, rivets, tapit pins, or any other suitable method. The panels are constructed of plywood or other suitable materials, for example steel or polymer. In an embodiment, the panels comprise corrugated metal panels including a plurality of recessed channels that give the panels added structural strength and stiffness.

Posts 36 are fastened to top rail 18 by suitable means such as rivets, screws or the like. Thus, the panels are secured to the top rail though their connection to the posts. An outer skin 21 is fastened to the trailer's top and bottom rails. The portion of the top rail to which the posts are fastened extends behind liner panels 38.

Figure 3:
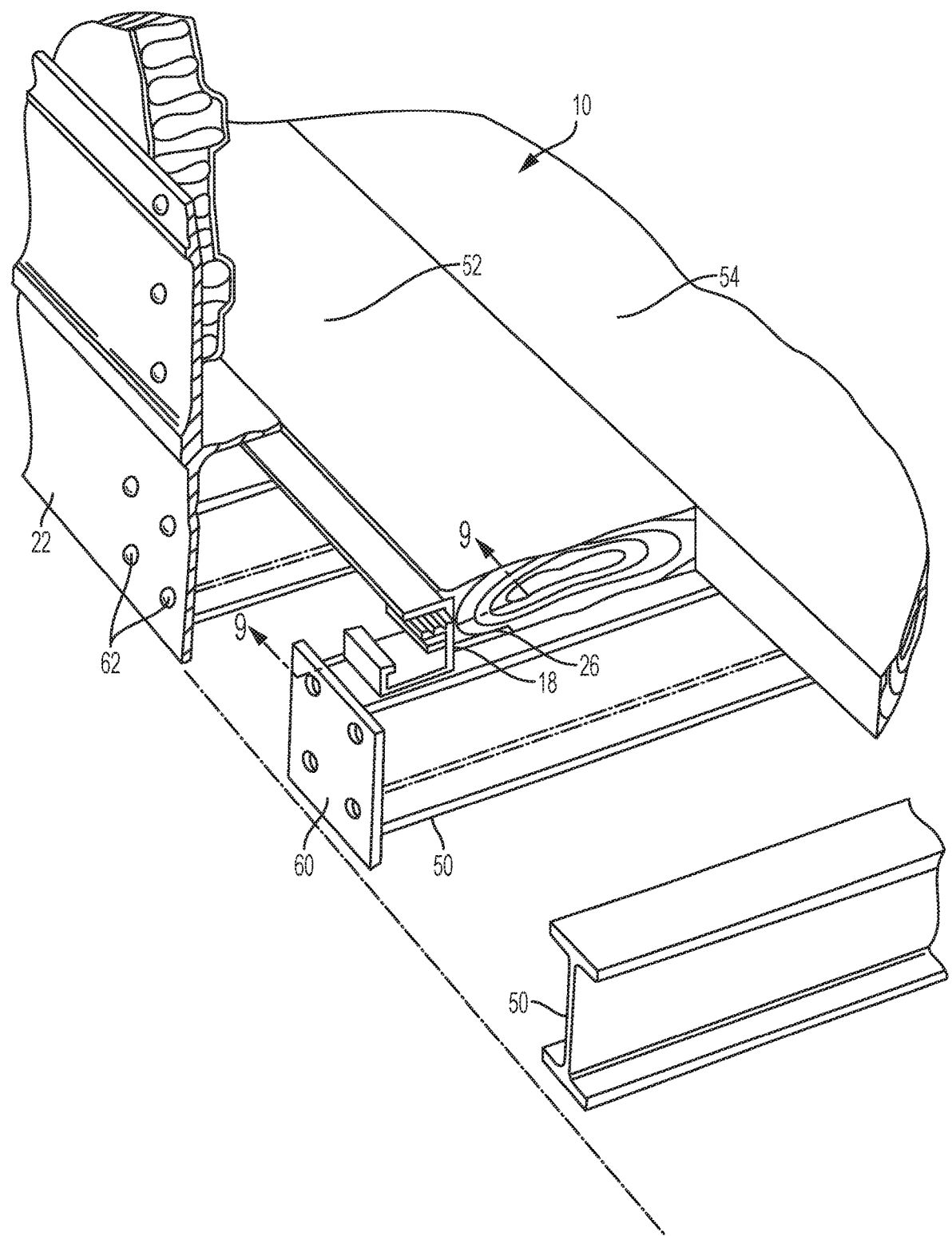
FIG. 3 is a partial perspective cut away view of the semi-trailer of FIG. 1.
Figure 10:
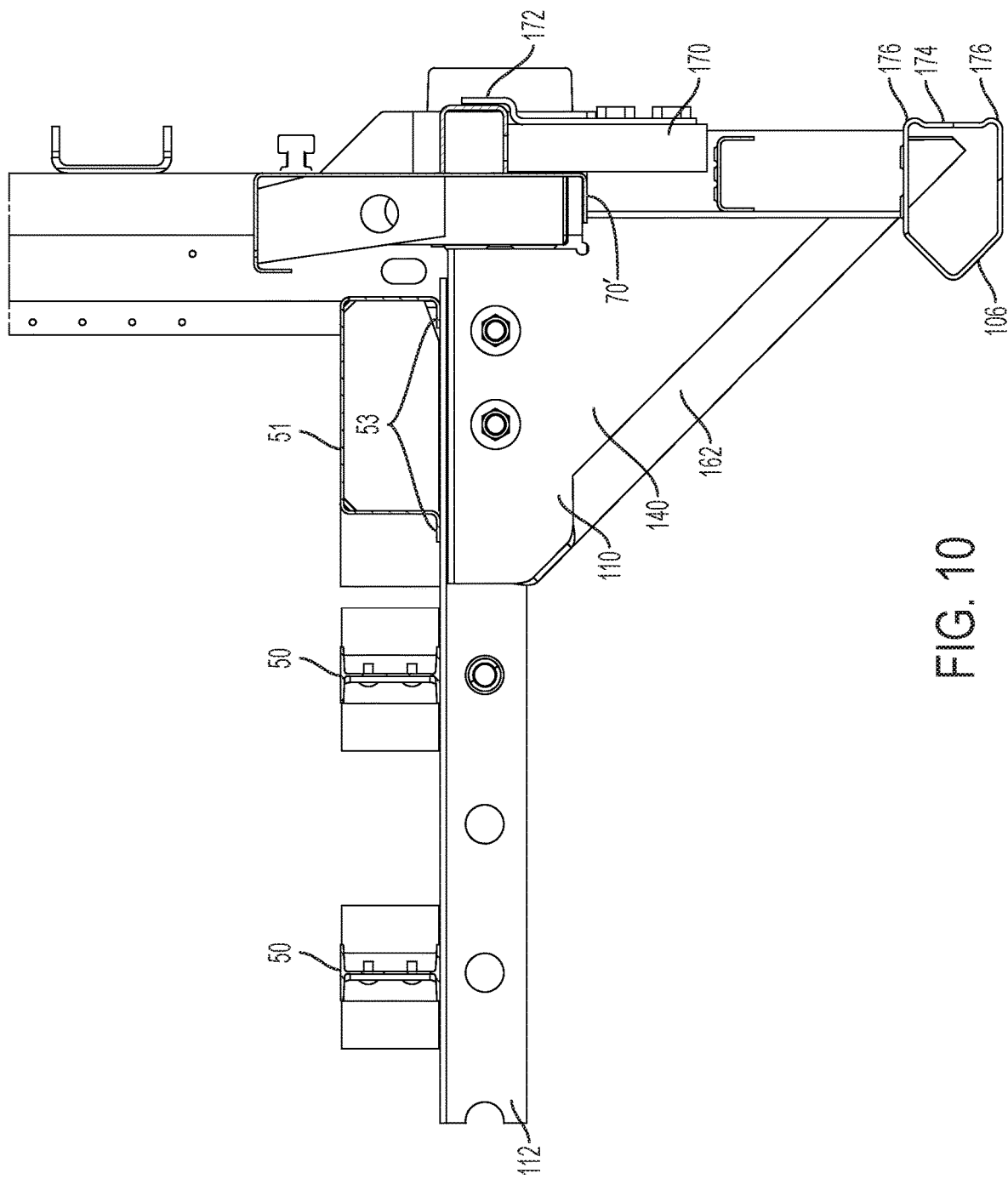
FIG. 10 is a cross section of a rear impact guard assembly in accordance with an embodiment of a semi-trailer.

As best seen in FIG. 3, the deck assembly includes a floor 10 and I-beam support members, also referred to as I-beams, 50 that extend transverse to the longitudinal direction of the trailer and that are connected on both ends to respective trailer bottom rails 22 (one of which is shown in FIG. 3). The floor comprises a series of parallel longitudinal floorboards including an edge plank 52 and inner planks 54 extending side-by-side across the trailer and secured to I-beam support members 50 by bolts or other materials and methods as should be understood in the art. Each I-beam 50 includes an end plate 60 welded to each end, and end plates 60 are fastened to a bottom portion of a bottom rail 22 via, for example, rivets 62. Referring to FIG. 10, in a further embodiment, a U-channel support member 51 (the opening of the channel facing downwards) is used in place of the rearmost I-beam support member 50 in FIG. 4. U-channel 51 has forward-extending flanged feet 53 that facilitate attachment to various components.

Figure 4:
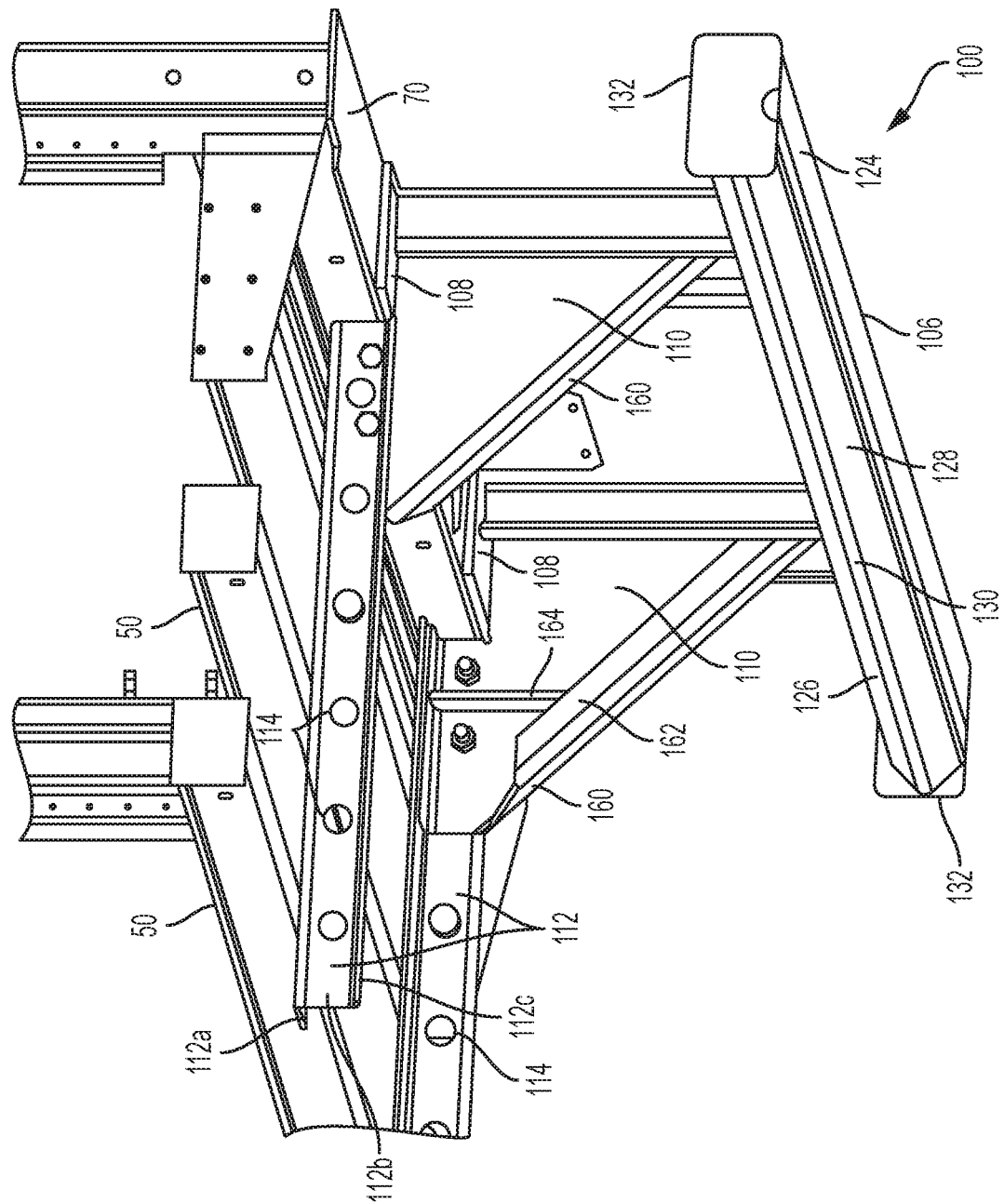
FIG. 4 is a perspective view of a rear impact guard assembly attached to the semi-trailer of FIG. 1.

Referring to FIG. 4, rear end frame 28 (FIG. 1) comprises a rear sill 70 (see also FIG. 1) that extends transverse along the frame's bottom end. Rear sill 70 provides structural support to the frame as well as receptacles for tail lights, bumpers, and brackets for mating with latches that hold doors 30 closed. Moreover, rear sill 70 has a generally horizontal, planar bottom face against which a rear impact guard 100 mounts.

Figure 5:
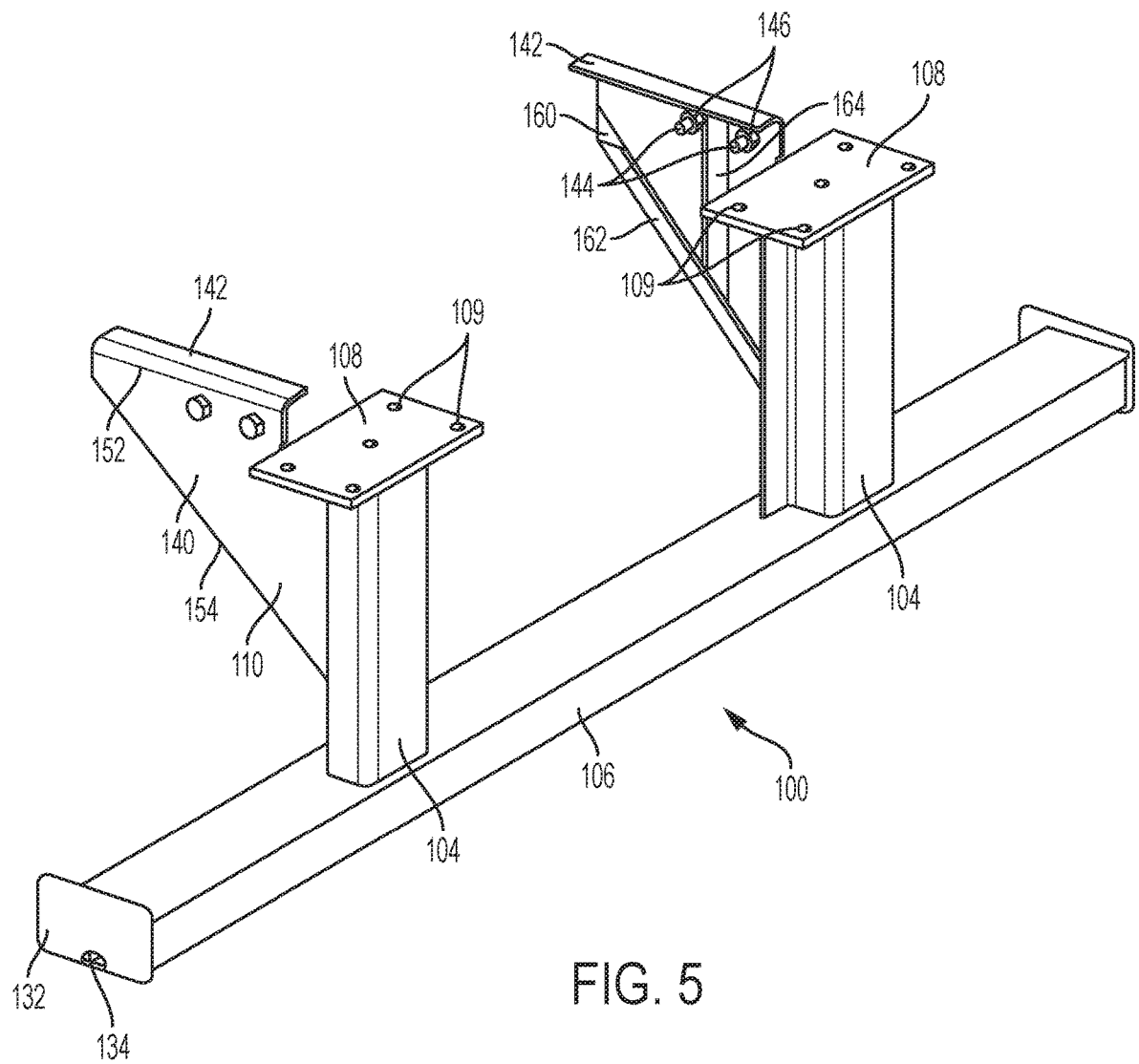
FIG. 5 is a perspective view of the rear impact guard assembly of FIG. 4.

Referring also to FIG. 5, rear impact guard 100 includes a pair of vertical guards 104 that extend between, and attach via weldment to, a rear cross guard member 106 and a pair of respective rectangular mounting plates 108 that abut rear sill 70. Five three-quarter, grade eight bolts (not shown), arranged in an "X" pattern, with one bolt in each corner and one in the center (the pattern best shown in FIG. 5 by through-holes 109) of each mounting plate 108, extend through holes 109 in each of mounting plates 108 through corresponding holes in rear sill 70 and are held in place via nuts (not shown). Referring to FIG. 10, in a further embodiment, a pair of vertically oriented U-channels 170 (one shown in FIG. 10) provide a means for attaching vertical guards 104 to a rear sill 70' having a different profile than rear sill 70 (FIG. 4). Each U-shaped channel is elongated in the vertical direction and attaches at its upper end to rear sill 70' via weldment. The sides of the "U" are sufficiently spaced apart so that the U-shaped channel can receive a respective vertical guard therebetween, each vertical guard extending upward through the open lower end of the U-shaped channel. A pair of Z-shaped plates 172 (one shown in FIG. 10) attach via weldment to respective U-channels 170 and rear sill 70', thereby further securing U-channels 172 to rear sill 70'. U-channel 170 receives an upper rear portion of vertical guards 104, and vertical guards 104 extend vertically upward to a bottom surface of rear sill 70. Upper and lower through-holes extend through each of channels 170, Z-shaped plates 172 and vertical guards 104, and respective upper and lower holes align to receive bolts therethrough, thereby attaching vertical guards to rear sill 70'.

Figure 9:
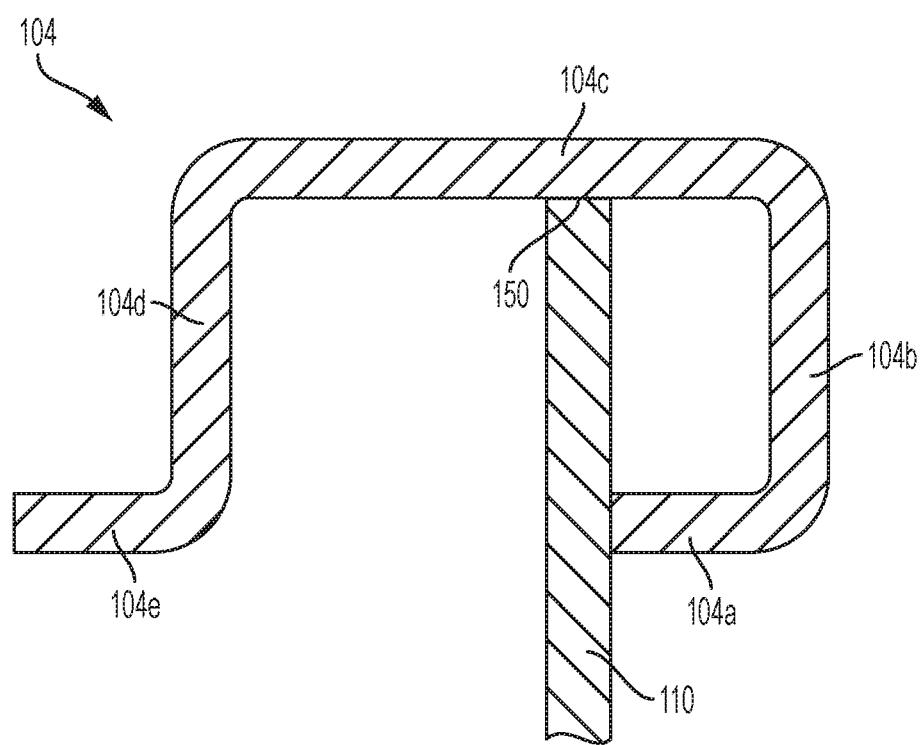
FIG. 9 is a cross section of a support member of the rear impact guard assembly of FIG. 4.

Referring to FIGS. 4, 5 and 9, vertical guards 104 (one shown in FIG. 9) have a five-sided channel cross sectional profile, including a first section 104a, a second section 104b perpendicular to section 104a, a third section 104c perpendicular to section 104b and parallel to section 104a (defining a channel therebetween), a fourth section 104d parallel to section 104b, and a fifth section 104e that is aligned with and extends away from section 104a. Vertical guards 104 have symmetrical cross sections, mirrored about a vertical plane that bisects the two guards. Each vertical guard 104 is further welded to a respective strut or gusset 110 that extends and attaches to a respective longitudinally extending slide rail 112. In a further embodiment not illustrated in the figures, gussets 110 extend between cross guard 106 and respective slide rails 112. Gussets 110 attach to cross guard 106 via weldment and further attach to the slide rails as discussed below.

Still referring to FIG. 4, slide rails 112 are conventionally used in trailers for adjustable connection of the trailer suspension to the trailer floor and have z-shaped cross sections so that an assembled slide rail forms a z-channel defined by a top horizontal section 112a, intermediate vertical section or web 112b, and lower short horizontal cross section 112c. Slide rails 112 have a plurality of equally-spaced through-holes 114 in their vertical sections 112b that are configured to receive locking pins that enable various axle configurations. In varying which of holes 114 receive the locking pins, an operator may select an axle placement location closer to, or further from, the rear of the trailer, thereby changing the loading distribution between the tractor's axles and the trailer's axles. The upper horizontal section 112a of the slide rail is affixed via weldment to the conventional structural cross I-beams 50 on the underside frame and the rear door frame of the trailer body. Slide rails 112 transfer energy of an impact from gussets 110 to I-beams 50, as detailed below.

Referring also to FIG. 5, gussets 110 include a generally right triangular main generally planar portion 140 that is vertically-oriented and extends in the longitudinal direction of the trailer so that a vertically oriented edge 150 (FIG. 9) is disposed furthest towards the rear of the trailer, a horizontal edge 152 extends longitudinally beneath the underside of the trailer, and a third edge 154 is angled at approximately 45 degrees with respect to a horizontal plane and extends from the bottom of vertical edge 150 to the front-most limit of horizontal edge 152. These three edges define generally planar, generally triangular major surfaces that are aligned vertically and on opposite sides of the gusset. Given the relatively small horizontal thickness of the plate between these generally planar surfaces (relatively, compared to the height and width of the gusset's web portion), the gusset's web portion may be considered generally planar. In providing gussets 110 with approximately 45 degree angles at their bottom edges, with respect to horizontal, the gussets extend forward to a point at least beneath an I-beam 50a, which is the I-beam closest to rear sill 70. In the configuration including a U-channel rearmost cross-member, illustrated in FIG. 10, the gusset extends beyond the U-channel member. As best seen in FIG. 9, vertical edge 150 of each main planar portion 140 is welded to an inside face of third section 104c of vertical guard 104.

Referring again to FIGS. 4 and 5, a flange extends 90 degrees inward (towards a middle of the trailer) from each main planar portion 140 of gussets 110 to form a generally planar top flange 142 that runs parallel to and abuts an underside face of top horizontal section 112a of slide rail 112. Bolts 144 extend through through-holes in main planar portion 140 and through through-holes in intermediate vertical section 112b into nuts 146 to secure each gusset 110 to a respective slide rail 112. A first gusset stiffening flange 160 extends perpendicularly from each main planar portion 140 and towards the middle of the trailer from third edge 154. A second gusset stiffening flange 162 extends vertically upward from an edge of gusset stiffening flange 160 opposite third edge 154. An elongated planar vertical gusset-stiffening member 164 is welded to an inside face of each of main planar portions 140, opposing the opposite main planar portion 140, and bisects the positions of bolts 144 from top flange 142 to first gusset stiffening flange 160 and extends the distance from main face 140 to second gusset stiffening flange 162 transverse to the trailer's longitudinal direction. Each of the above stiffening members provides rigidity, especially in its direction of elongation, to prevent deformation of gussets 110. Main planar portion 140, first stiffening flange 160, second stiffening flange 152, and top flange 142 are formed from one plate, and each flange is fabricated via bending.

Figure 6:
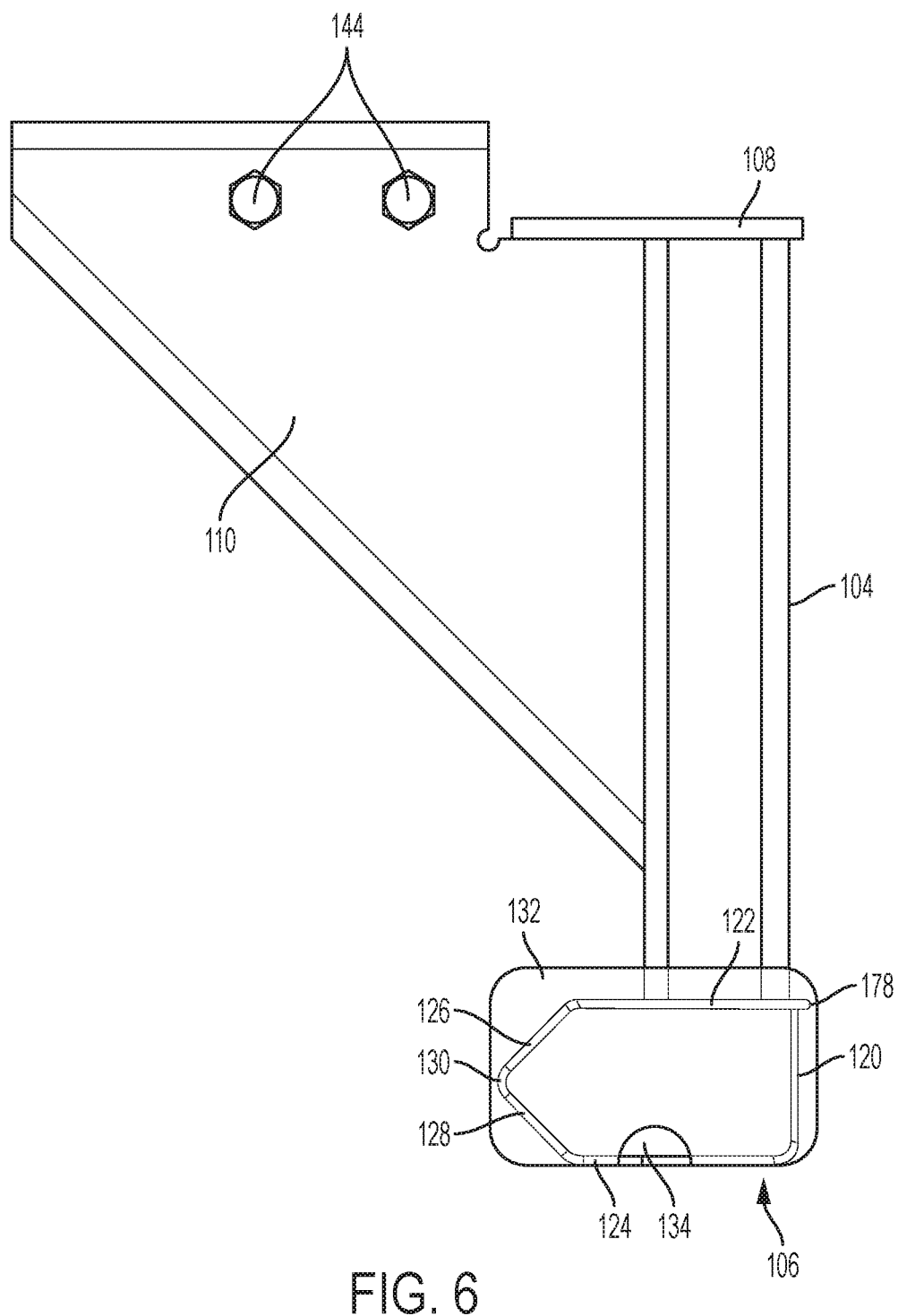
FIG. 6 is a side view of the rear impact guard assembly of FIG. 4.
Figure 7:
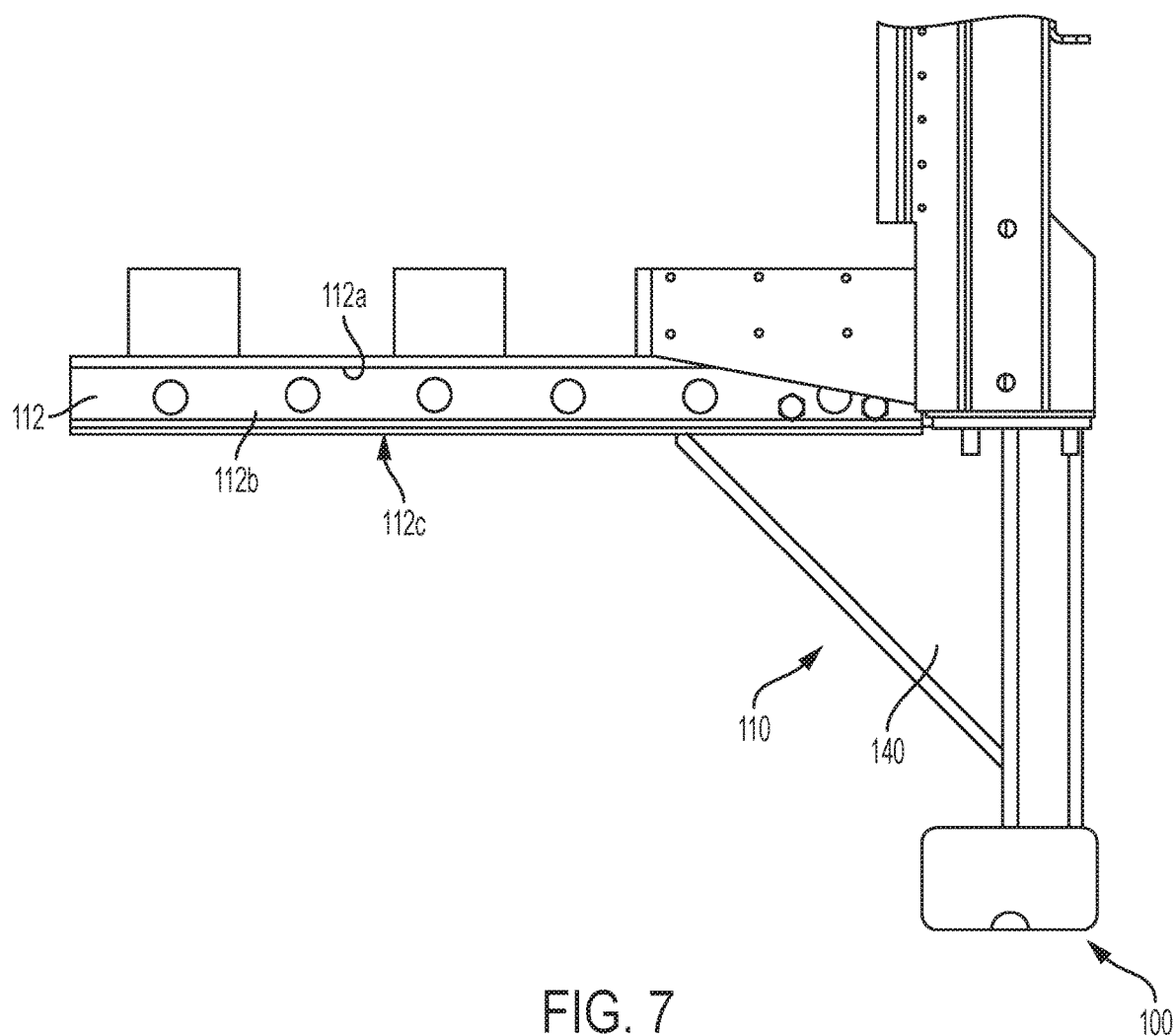
FIG. 7 is a side view of the rear impact guard assembly of FIG. 4 attached to the semi-trailer of FIG. 1.
Figure 8:
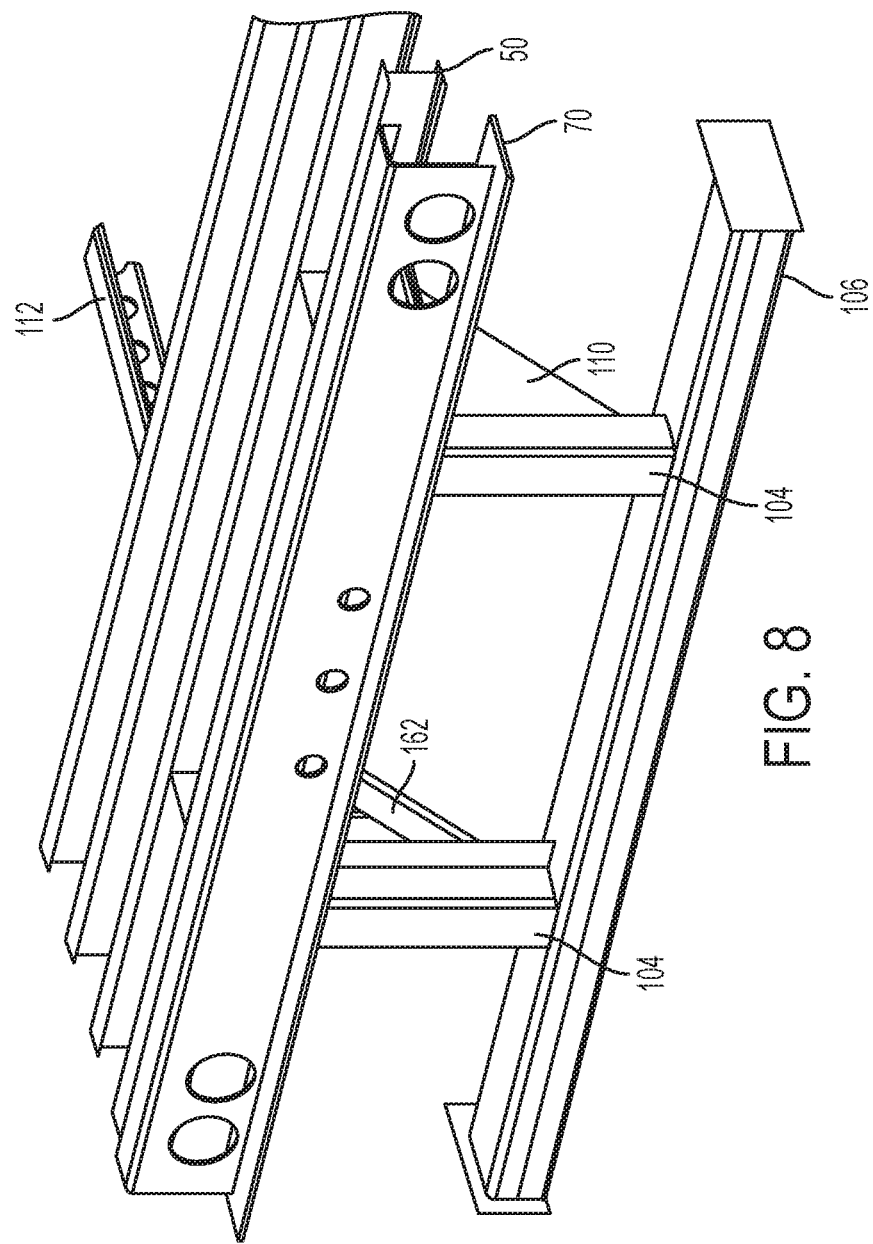
FIG. 8 is a perspective view of the rear impact guard assembly of FIG. 4.

Referring to FIG. 6, cross guard 106 is an elongated hollow member with a pentagonal cross section (considered when sectioned by a vertical plane), having a horizontal, generally planar top side 122, a horizontal, elongated, generally bottom side 124, and an elongated, generally planar rear side 120 extending transverse at respective rear edges from top side 122 to bottom side 124. A first elongated planar side 126 extends downwards at about a 45 degree angle with respect to horizontal from the top planar piece, and a second elongated planar side 128 extends upwards at about a 45 degree angle with respect to horizontal from the bottom planar top side, meeting in the middle at a filleted edge 130 to thereby create the pentagonal profile of cross guard 106. In one embodiment, cross guard 106 is roll-formed. In a further embodiment, cross guard 106 includes a member having a rectangular cross section and a right angle member welded to a front of the rectangular member. In having a pentagonal profile, cross guard 106 has an aerodynamic profile that reduces wind resistance, or drag. Top side 122 and bottom side 124 are equal in length with respect to the trailer's longitudinal direction, and this longitudinal length is greater than the vertical length of rear side 120. As such, the pentagonal profile is elongated in the longitudinal direction of the trailer so that its section modulus is greater about a vertical axis than about an axis parallel to the trailer's longitudinal direction. The pentagonal cross section provides an optimization between its section modulus and its weight. In an embodiment, cross guard 106 comprises seven-gauge or thicker steel having at least 80,000 psi minimum yield strength. In a further embodiment, cross guard 106 comprises five- or six-gauge steel. In a further embodiment, cross guard 106 comprises steel having at least 90,000 psi minimum yield strength. In yet a further embodiment, cross guard 106 comprises steel having at least 100,000 psi minimum yield strength. In a further embodiment, shown in FIG. 10, cross guard 106 includes a slightly recessed channel 174 to receive conspicuity tape so that protruding edges 176 above and below protect the tape from being torn or worn off due to slight bumps or scuffing. Similarly, an overhanging edge, shown in FIG. 6, protects conspicuity tape.

Referring to FIG. 6, top side 122 has perforations therethrough to provide a rough surface at the top of the horizontal member. A plate 132 is welded onto each end of cross guard 106 and each plate 132 having a hole 134 therethrough and disposed at the bottom of the cross guard to generally close off the channel but allow any water therein to drain. Plates 132 extend above an upper surface of cross guard 106.

Referring to FIGS. 4 and 5, cross guard 106 comprises a beam that spans at least a majority of the width of the semi-trailer in the transverse direction. The profile of cross guard 106 in combination with its relatively high material thickness and yield stress as compared to materials used in the prior art, produces a bumper with a section modulus perpendicular to its direction of elongation that enables the bumper to resist deflection. In this way, when a vehicle impacts cross guard 106, the cross guard stays generally rigid. As the lateral momentum of an impacting vehicle transfers to cross guard 106, cross guard 106, by way of attachment plates 108 and staying generally undeformed, converts the lateral momentum into rotational momentum about an axis generally defined by a line through the centers of attachment plates 108. It should be understood that the axis of rotation's location is approximated and dependent on a number of factors including, for example, impact height and resistance to torsion of rear sill 70. Similarly, gussets 110 have structural rigidity that is resistant to bending so that they transfer impact energy to the slide rails 112 at interfaces between flanges 142 and top horizontal sections 112a. By transferring the lateral momentum into rotational momentum, impact energy is transferred to I-beams 50.

As stated above, because gussets 110 are rigid, in the event of an impact, the gussets remain generally undeformed and transfer impact energy through slide rails 112 to the I-beams. Gussets 110 extend only to an I-beam 50a (that is, the I-beam closest to rear sill 70), or in further embodiments comprising a U-channel proximate the rear sill, to the U-channel. Therefore, as rear guard 100 pivots about its axis, the I-beam 50a (or the U-channel) bends where gusset 110 is providing a vertical force. However, because I-beams 50 attach to slide rails 112, as I-beam 50a or the U-channel directly above gusset 110 bends upwards, each slide rail 112 bends upwards where it attaches to gusset 110. Therefore, as gussets 110 force slide rails 112 upwards, slide rails 112 lift one or more I-beams 50 in addition to the first I-beam 50. Lifted I-beams 50 deform at their contact areas with slide rail 112, thereby transferring the impact energy into deforming not only I-beam 50a directly above gusset 110 but one or more I-beams 50 proximate I-beam 50*a*. In this way, impact energy is distributed between a plurality of I-beams, thereby enabling the impact guard of the illustrated embodiment to withstand impacts of greater energy.

It should be understood, in view of the present disclosure, that the geometry of the cross section of guard member 106 may vary within the bounds of the present disclosure. For purposes of example only, and with reference to FIG. 6, edge 130 may be considered the leading edge of the central, elongated portion of guard member 106, in that edge 130 is the forwardmost part of the central guard member portion and, thus, the first to engage air flowing over and around the guard member. The leading edge extends the length of the guard's central section. In general, a surface (in this instance, two surfaces, 126 and 128) extend from leading edge 130 to either (or both) of the guard's top surface 122 and bottom surface 124, away from a vertical plane (not shown) that includes leading edge 130. While two such surfaces (126 and 128) are illustrated in the Figures, it will be understood from the present disclosure that, in other embodiments, there is only one such surface, for instance where the leading edge is aligned with top portion 122 or bottom portion 124. It will also be understood that while surfaces 126 and 128 are illustrated as being generally planar, in other embodiments they (or a single surface) is curved outward when viewed in cross-section by a vertical plane aligned in the trailer's longitudinal direction.

While one or more preferred embodiments of the invention are described above, it should be appreciated by those skilled in the art that various modifications and variations can be made in the present invention without departing from the scope and spirit thereof. Accordingly, it should be understood that the elements of one embodiment may be combined with another embodiment to create a still further embodiment. It is intended that the present invention cover such modifications and variations as come within the scope and spirit of the present disclosure, the appended claims, and their equivalents.

The invention claimed is:

1. A semi-trailer having a forward end and a rearward end, comprising:
    a cargo compartment comprising two opposed side walls that are spaced apart in a first direction perpendicular to a longitudinal dimension of the trailer, a floor extending between lower ends of the two side walls, a roof extending between upper ends of the two side walls, a front wall extending between forward ends of the side walls and between forward ends of the roof and the floor, and a rear frame spaced apart from the front wall in a second direction in the longitudinal dimension and attached to rearward ends of the side walls, the roof, and the floor, wherein the floor is configured to connect to a fifth wheel of a tractor;
    a plurality of axles attached beneath the floor at the rearward end of the semi-trailer and a plurality of wheels disposed on the axles;
    a guard member elongated in the first direction and spanning at least a majority of the width of the semi-trailer in the first direction; and
    a first vertical support member and a second vertical support member, each attached to and extending below the rear frame and attached to the guard member, thereby attaching the guard member to the rear frame, wherein the first vertical support member and the second vertical support member are spaced apart from each other in the first direction,
    wherein the guard member has a leading edge extending at a forward end of the guard member, a top portion, and a bottom portion, and wherein the guard member defines a surface extending from the leading edge to one of the top portion and the bottom portion rearward from a vertical plane that includes the leading edge,
    wherein the guard member has a pentagonal cross section in the second direction, and
    wherein the guard member comprises
        a generally planar vertical portion that is generally parallel to the first direction,
        the top portion being generally planar and extending from a top edge of the generally planar vertical portion in the second direction and toward a forward end of the semi-trailer,
        the bottom portion being generally planar and extending from a bottom edge of the generally planar vertical portion in the second direction and toward a forward end of the semi-trailer,
        the surface having a first generally planar forward portion extending downward from a forward edge of the top generally planar portion at an obtuse angle with respect to the top generally planar portion, and
        the surface having a second generally planar forward portion extending upward from a forward edge of the bottom generally planar portion at an obtuse angle with respect to the bottom generally planar portion and meeting the first forward portion at the leading edge so that the vertical portion, the top portion, the bottom portion, the first forward portion, and the second forward portion comprise the pentagonal cross-sectional profile of the guard member.

2. A semi-trailer having a forward end and a rearward end, comprising:
    a cargo compartment comprising two opposed side walls that are spaced apart in a first direction perpendicular to a longitudinal dimension of the trailer, a floor extending between lower ends of the two side walls, a roof extending between upper ends of the two side walls, a front wall extending between forward ends of the side walls and between forward ends of the roof and the floor, and a rear frame spaced apart from the front wall in a second direction in the longitudinal dimension and attached to rearward ends of the side walls, the roof, and the floor, wherein the floor is configured to connect to a fifth wheel of a tractor;
    a plurality of axles attached beneath the floor at the rearward end of the semi-trailer and a plurality of wheels disposed on the axles;
    a guard member elongated in the first direction and spanning at least a majority of the width of the semi-trailer in the first direction; and
    a first vertical support member and a second vertical support member, each attached to and extending below the rear frame and attached to the guard member, thereby attaching the guard member to the rear frame, wherein the first vertical support member and the second vertical support member are spaced apart from each other in the first direction,
    wherein the guard member has a leading edge extending at a forward end of the guard member, a top portion, and a bottom portion, and wherein the guard member defines a surface extending from the leading edge to one of the top portion and the bottom portion rearward from a vertical plane that includes the leading edge,
    wherein the floor comprises
        a deck, a plurality of transverse support members beneath the deck, each extending in the first direction across the width of the trailer, wherein the transverse support members are spaced from each other in the second direction a first support rail beneath and abutting the transverse support members and being elongated in the second direction, and a second support rail beneath and abutting the transverse members and being elongated in the second direction, wherein each of the first and second support rails comprises a generally planar, elongated horizontal portion having a top surface that abuts respective bottom surfaces of a plurality of the transverse support members, and a generally planar, elongated vertical portion that extends downward from an edge of the horizontal portion, wherein a first strut extends between the first support rail and at least one of a lower end of the first vertical support member and the guard member and attaches to the at least one of a lower end of the first vertical support member and the guard member, and wherein the first strut has a first horizontal, generally planar upper flange at a top edge that abuts a bottom surface of the elongated horizontal portion of the first support rail, and wherein a second strut extends between the second support rail and at least one of a lower end of the second vertical support member and the guard member and attaches to the at least one of the lower end of the second vertical support member and the guard member, and wherein the second strut has a first horizontal, generally planar upper flange at a top edge that abuts a bottom surface of the elongated horizontal portion of the second support rail.

3. The semi-trailer as in claim 1, wherein the guard member has a first section modulus with respect to a first axis that is spaced equally between a frontmost point and a rearmost point of the guard member and extends in a third direction that is perpendicular to the first direction and the second direction that is greater than a second section modulus with respect to a second axis that is equally spaced between a topmost point and a bottommost point of the guard member and extends in the second direction.

4. The semi-trailer as in claim 1, wherein the guard member has at least one of an at least seven gauge wall thickness and an approximately 80,000 psi minimum yield strength.

5. The semi-trailer as in claim 4, wherein the guard member has at least one of an at least seven gauge wall thickness and an approximately 100,000 psi minimum yield strength.

6. A semi-trailer having a forward end and a rearward end, comprising:
a cargo compartment comprising two opposed side walls that are spaced apart in a first direction perpendicular to a longitudinal dimension of the trailer, a floor extending between lower ends of the two side walls, a roof extending between upper ends of the two side walls, a front wall extending between forward ends of the side walls and between forward ends of the roof and the floor, and a rear frame spaced apart from the front wall in a second direction in the longitudinal dimension and attached to rearward ends of the side walls, the roof, and the floor, wherein the floor is configured to connect to a fifth wheel of a tractor and comprises a deck,
a plurality of transverse support members beneath the deck, each extending in the first direction across the width of the trailer, wherein the transverse support members are spaced from each other in the second direction,
a first support rail beneath and abutting the transverse support members and being elongated in the second direction, and
a second support rail beneath and abutting the transverse members and being elongated in the second direction,
wherein each of the first and second support rails comprises a generally planar, elongated horizontal portion having a top surface that abuts respective bottom surfaces of a plurality of the transverse support members, and a generally planar, elongated vertical portion that extends downward from an edge of the horizontal portion;
a plurality of axles attached beneath the floor at the rearward end of the semi-trailer and a plurality of wheels disposed on the axles;
a guard member elongated in the first direction and spanning at least a majority of the width of the semi-trailer in the first direction;
a first vertical support member and a second vertical support member, each attached to and extending below the rear frame and attached to the guard member, thereby attaching the guard member to the rear frame, wherein the first vertical support member and the second vertical support member are spaced apart from each other in the first direction;
a first strut that extends between the floor and at least one of lower end of the first vertical support member and the guard member and attaches to the at least one of the lower end of the first vertical support member and the guard member; and
a second strut that extends between the floor and at least one of lower end of the second vertical support member and the guard member and attaches to the at least one of the lower end of the second vertical support member and the guard member,
wherein each of the first strut and the second strut comprises a first vertically oriented, generally planar portion extending in the second direction and having a lower generally diagonal edge that extends at an acute angle with respect to horizontal, a first generally planar stiffening flange extends perpendicular to the first generally planar portion from the diagonal edge, and a second generally planar stiffening flange extends from an edge of the first stiffening flange opposite the first planar portion in a direction perpendicular to the first stiffening flange, and
wherein the first strut has a horizontal, generally planar upper flange at a top edge of the first strut that abuts a bottom surface of the elongated horizontal portion of the first support rail, and wherein the second strut has a horizontal, generally planar upper flange at a top edge of the second strut that abuts a bottom surface of the elongated horizontal portion of the second support rail.

7. The semi-trailer as in claim 6, wherein the first strut attaches to the vertical portion of the first support rail and wherein the second strut attaches to the vertical portion of the second support rail.

8. The semi-trailer as in claim 6, wherein the first strut comprises a third stiffening flange being elongated in the vertical direction and attached to the first vertically oriented, generally planar portion of the first strut, and wherein the second strut comprises a third stiffening flange being elongated in the vertical direction and attached to the first vertically oriented, generally planar portion of the second strut.

\* \* \* \* \*